(12) United States Patent
Tumlin (10) Patent No.: US 6,935,196 B1
(45) Date of Patent: Aug. 30, 2005

(54) METHOD AND APPARATUS FOR TESTING THE STRUCTURAL INTEGRITY OF OFFSHORE LIFTING CONTAINERS

(76) Inventor: David M. Tumlin, 1037 Jolie Blonde Rd., Breaux Bridge, LA (US) 70517

( * ) Notice: Subject to any disclaimer, the term of this patent is extended or adjusted under 35 U.S.C. 154(b) by 53 days.

(21) Appl. No.: 10/715,321

(22) Filed: Nov. 14, 2003

(51) Int. Cl.⁷ ............................................. G01L 1/26
(52) U.S. Cl. ............................................. 73/862.393
(58) Field of Search .................. 73/862.393, 862.392, 73/862.381, 862.391

(56) References Cited

U.S. PATENT DOCUMENTS 5,561,931 A * 10/1996 Duenkel .................. 40/606.11
6,494,103 B1 * 12/2002 Loong ......................... 73/788

* cited by examiner

Primary Examiner—Max Noori
Assistant Examiner—Corey D. Mack
(74) Attorney, Agent, or Firm—Robert N. Montgomery (57) ABSTRACT

An apparatus and method for load testing lifting containers and their related cable slings using a hydraulic jacking arrangement located within the container itself for equalized stress loading of the container and its cable slings and lifting eyes under various prescribed conditions. The apparatus being portable and expandable to accommodate various size containers applies isometric loading throughout the structural containment without lifting the container off the deck or inducing external heavy loads. The jacking arrangement includes tensions legs, an extendable screw jack and a hydraulic ram to which the container's cable slings are attached. Actuating the hydraulic ram applies tension to the cable slings and simultaneously to the tension legs located at strategic points on the floor of the container.

26 Claims, 8 Drawing Sheets

METHOD AND APPARATUS FOR TESTING THE STRUCTURAL INTEGRITY OF OFFSHORE LIFTING CONTAINERS

1. FIELD OF THE INVENTION

This invention relates generally to methods and test apparatus used in certification and periodic testing of offshore lifting containers and their associated lifting slings and more particularly to the certification and periodic testing of industry approved lifting containers generally used for lifting materials and loose equipment to and from supply vessels by offshore drilling rigs.

2. GENERAL BACKGROUND

Freight containers and the more relevant common offshore equipment containers discussed herein are subject to international convention rules governing their construction and periodic safety inspection. Such offshore containers are generally rectangular and vary in length from ten to over forty feet and are constructed of heavy steel tubular members with expanded metal plating. The containers are also equipped with their own cable slings. These containers and their lifting slings must be examined and certified when new and re-inspected every 6 months and pass a proof load test of up to two and one-half times their safe working load under various conditions every 24 months. With safe working loads of these containers reaching 24 tons or more, the testing apparatus is often quite large and heavy itself. Therefore, most testing is conducted at onshore facilities. This requires that the containers be transported great distances to these facilities at significant expense plus taking the containers out of service for long periods of time, incurring even greater expense.

Recently methods have been devised for carrying out the required load test on location such as the offshore rig itself or near the vicinity to the supply point utilizing the containers. Such methods include water bag weights. This allows for easy storage but requires a great deal of time to set up and fill the bags. Movement of the offshore rig produces an unstable platform and thus tends to overload some areas of the container more than others, producing an imprecise test. Further, such testing requires that the container be lifted off the deck with the water bags in place producing a potentially unsafe situation if the load shifts for any reason.

3. SUMMARY OF THE INVENTION

The invention disclosed herein provides an apparatus and method for load testing lifting containers and their related cable slings using a hydraulic jacking arrangement located within the container itself for equal stress loading of the container, its cable slings and lifting eyes under various prescribed conditions. The apparatus, being portable and expandable to accommodate various size containers, applies isometric loading throughout the structural containment without lifting the container off the deck or inducing external heavy loads. The jacking arrangement includes tensions legs, an extendable screw jack, and a hydraulic ram to which the container's cable slings are attached. Actuating the hydraulic ram applies tension to the cable slings and simultaneously to the tension legs located at strategic points on the floor of the container.

4. BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein.

5. DETAILED DESCRIPTION OF THE PREFERRED EMBODIMENT

Figure 1:
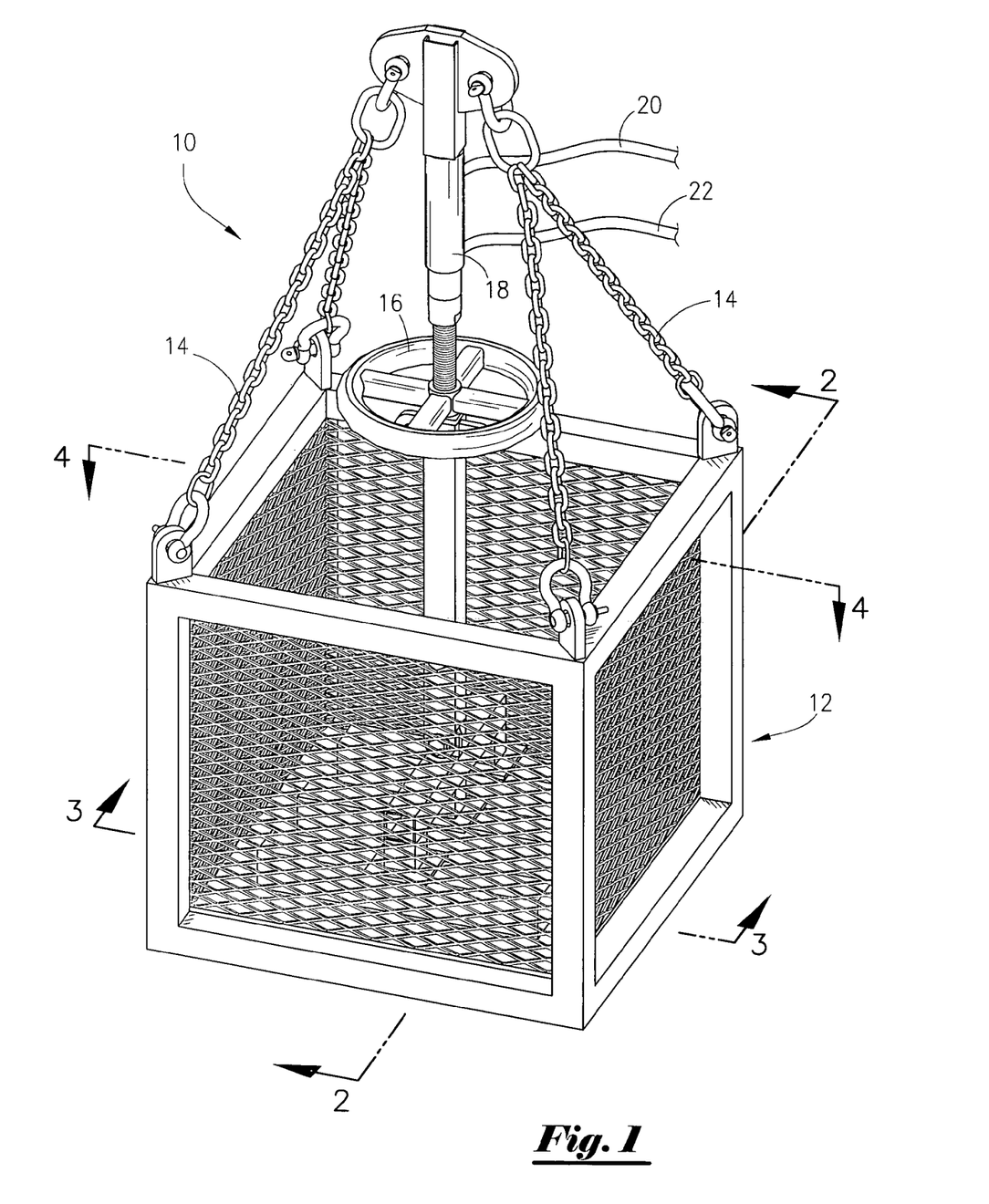
FIG. 1 is an isometric view of the tensioning apparatus in its simplest form.

As first seen in the assembly illustrated in FIG. 1, the test apparatus 10 is inserted into a container 12 to be tested and connected to the container's slings 14. Initial tension is then applied to the slings 14 by rotation of the tension wheel 16. Hydraulic fluid pressure is then applied to the hydraulic actuator assembly 18 via hydraulic line 20, thereby further applying downward force to the floor of the container. Pressure is then adjusted to the prescribed related test loading for the particular size container 12 being tested. Pressure may then be released by removing pressure on hydraulic line 20 and applying pressure to the head end of the actuator assembly 18 via hydraulic line 22.

It should be noted that although many types of open cargo containers are used for transferring cargo in offshore environments, the container shown in FIG. 1 utilizing tubular frame construction lined with expanded metal to allow for water drainage is most often the container of choice. However, the test apparatus 10 may be used successfully on many other types of containers in a variety of configurations.

Figure 2:
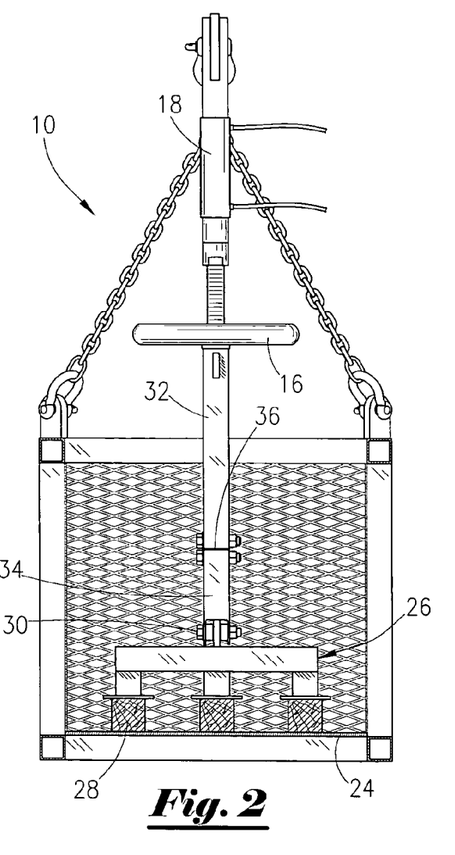
FIG. 2 is a partial cross-sectional side elevation view of the embodiment illustrated in FIG. 1.

As further seen in FIG. 2 the test apparatus is supported upon the container floor 24 by a footing assembly 26 resting on wooden beams 28 strategically placed so as to equalize point loading of the feet across the surface of the container floor 24 including any container support members thereof. The footing assembly 26 is pivotally connected to the test apparatus 10 by a clevis arrangement 30. A lower column portion 32 of the test apparatus 10 being rotatively extendable relative to the hydraulic actuator 18 is also extendable by adding additional lengths of tubing between the column 32 and pivot member 34 pined at joint 36.

Figure 3:
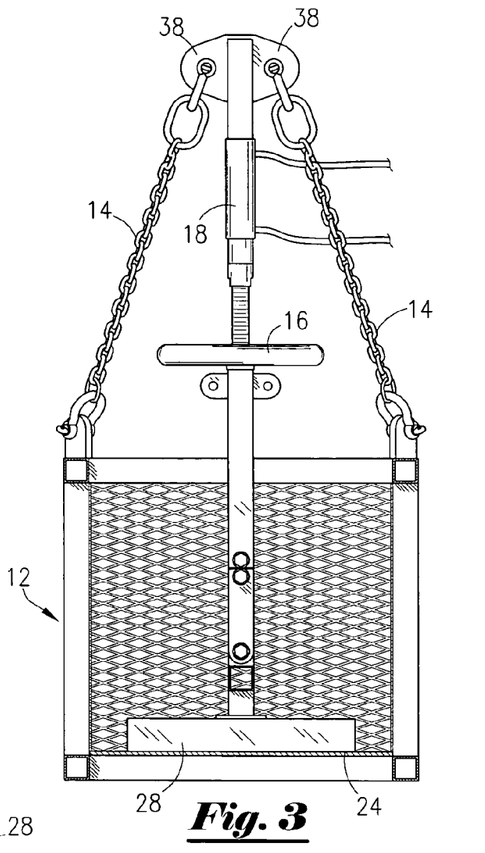
FIG. 3 is a cross-sectional front elevation view of the embodiment illustrated in FIG. 1.

As seen in FIG. 3 the slings 14 are connected to pad eyes 38 attached to the blind end of the hydraulic actuator 18. It can also be seen that the wooden beams 28 extend horizontally at least ⅔ of the width of the container floor 24.

Figure 4:
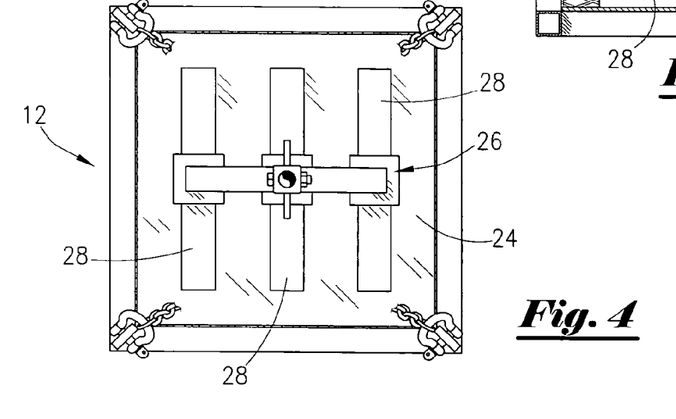
FIG. 4 is a top view of the embodiment illustrated in FIG. 1.

As shown in FIG. 4 the three feet of footing 26 are centrally located on the wooden beams 28 and spaced so that the concentrated force produced by the hydraulic cylinder is distributed equally across the container floor 24.

Figure 5:
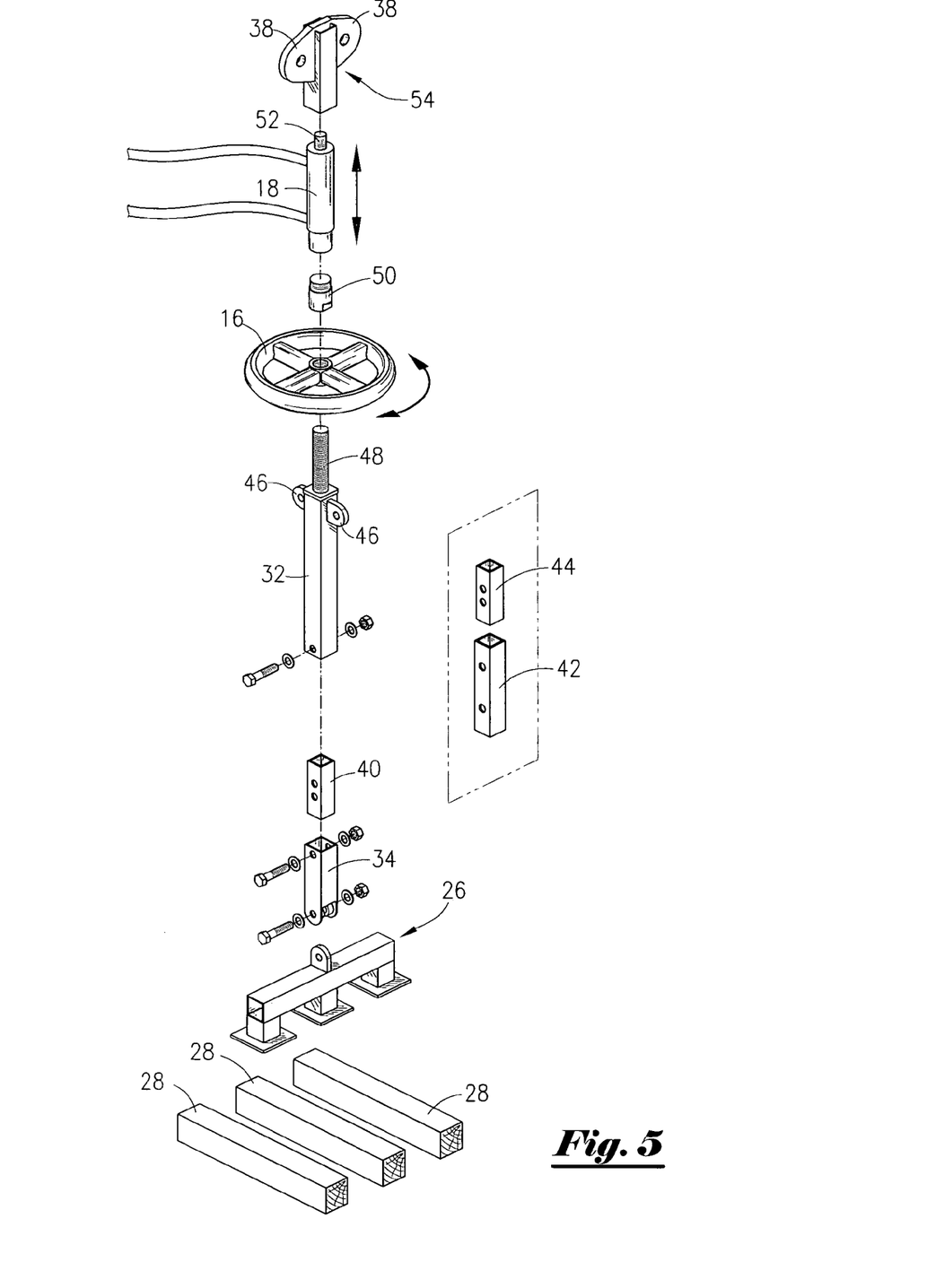
FIG. 5 is an exploded view of the tensioning mechanism illustrated in FIG. 1.

The nomenclature of the apparatus as better seen in FIG. 5 includes wooden beams 28 which may be cut to fit any desired container length, the foot assembly 26 the clevis column member 34, internal stub member 40, additional optional lengths of column tubing 42, additional stub members 44 as needed to extend the column 32 which also include pad eyes 46 and threaded rod 48, hand wheel 16 cylinder adapter head 50 hydraulic actuator 18 which includes threaded portion 52 and the column head member assembly 54, attached to the blind end of the pressure operated linear actuator 18, which includes the pad eyes 38.

Figure 6A:
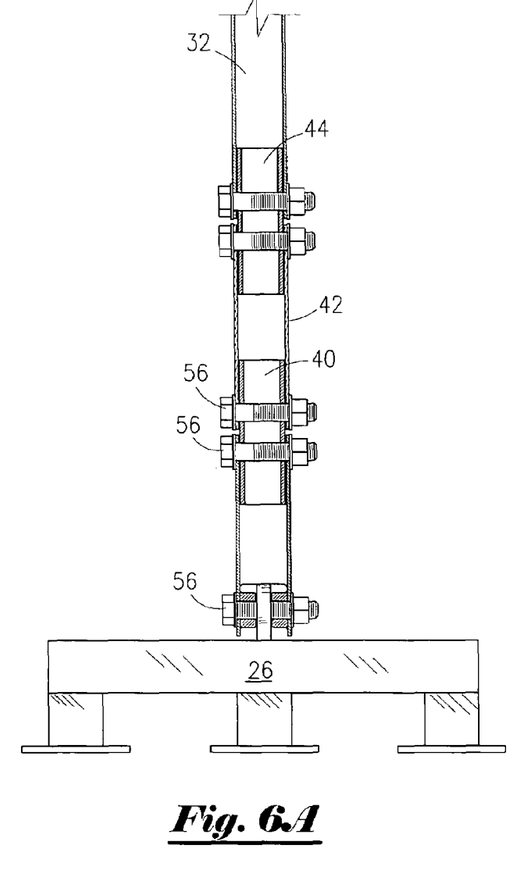
FIG. 6A is a cross-section view of the tensioning mechanism illustrated in FIG. 5.
Figure 6B:
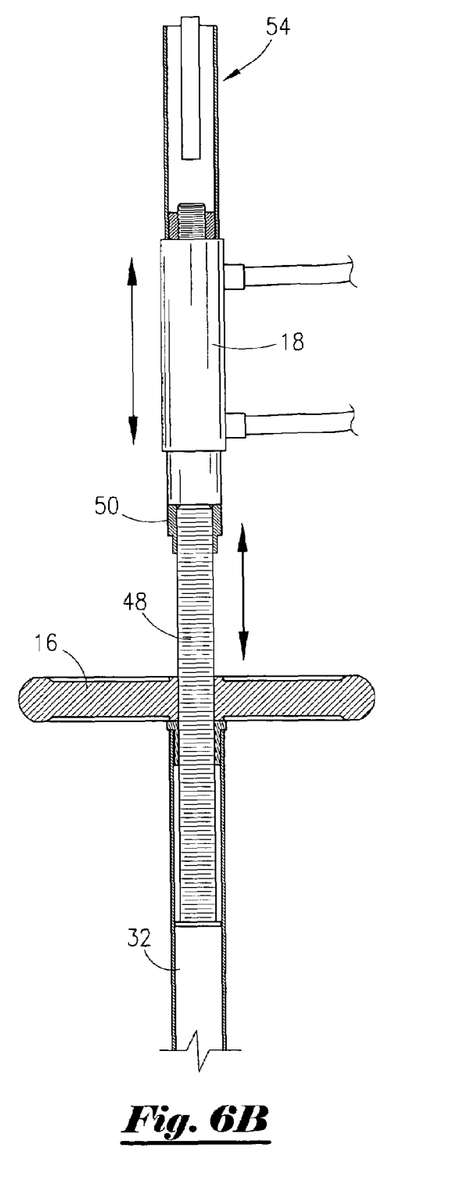
FIG. 6B is a continuation of the cross-section view of the tensioning mechanism illustrated in FIG. 6A.

As seen in FIG. 6A the above-mentioned column and foot members are connected with fasteners 56. As seen in FIG. 6B the threaded rod member 48 is threadably engaged with the hand wheel 16 and slidably inserted into the column member 32, the opposite end of which is threadably attached to the rod end of the pressure operated actuator 18, preferably a hydraulically operated cylinder, by adaptor 50. Rotating the hand wheel 16 extends or retracts the threaded rod 48 from within the tubular column 32, thus manually extending or retracting the vertical length of the column assembly.

Figure 7:
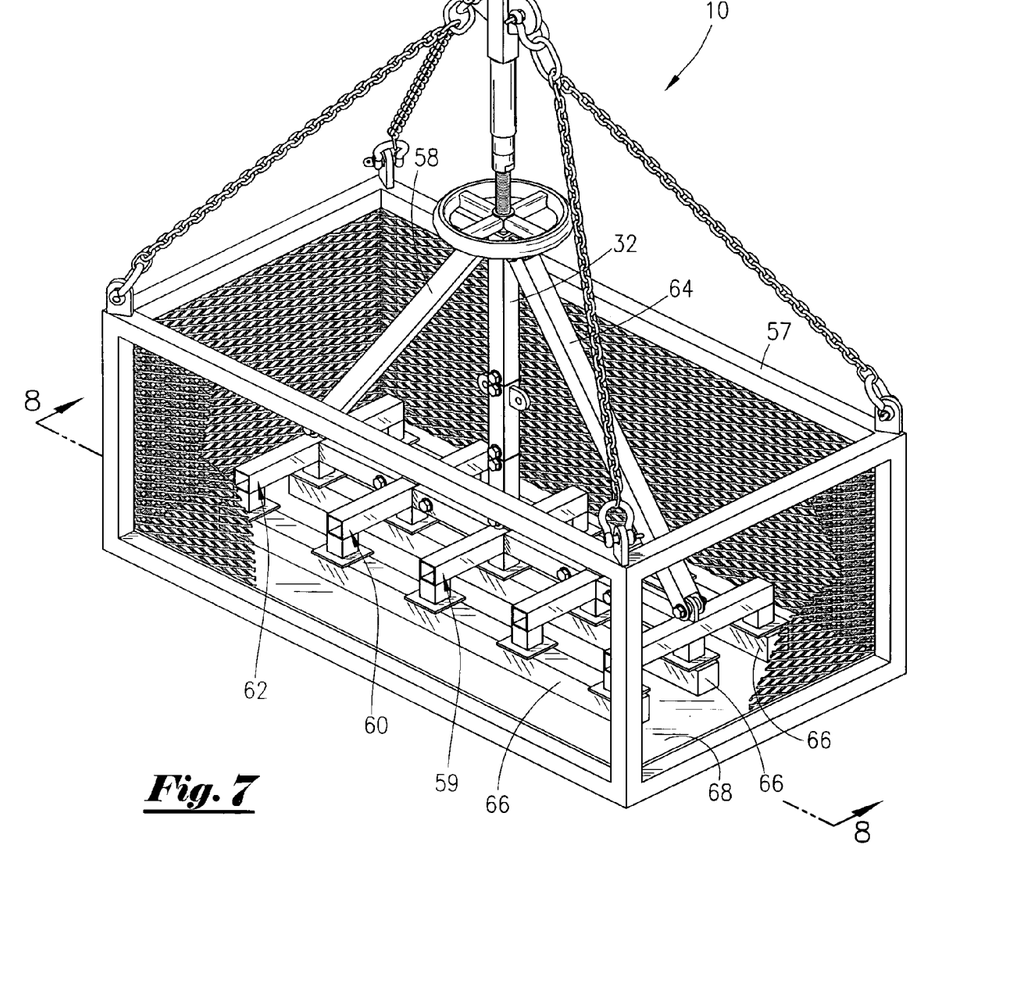
FIG. 7 is an isometric view of a second embodiment with adaptive tension legs for a larger container.
Figure 8:
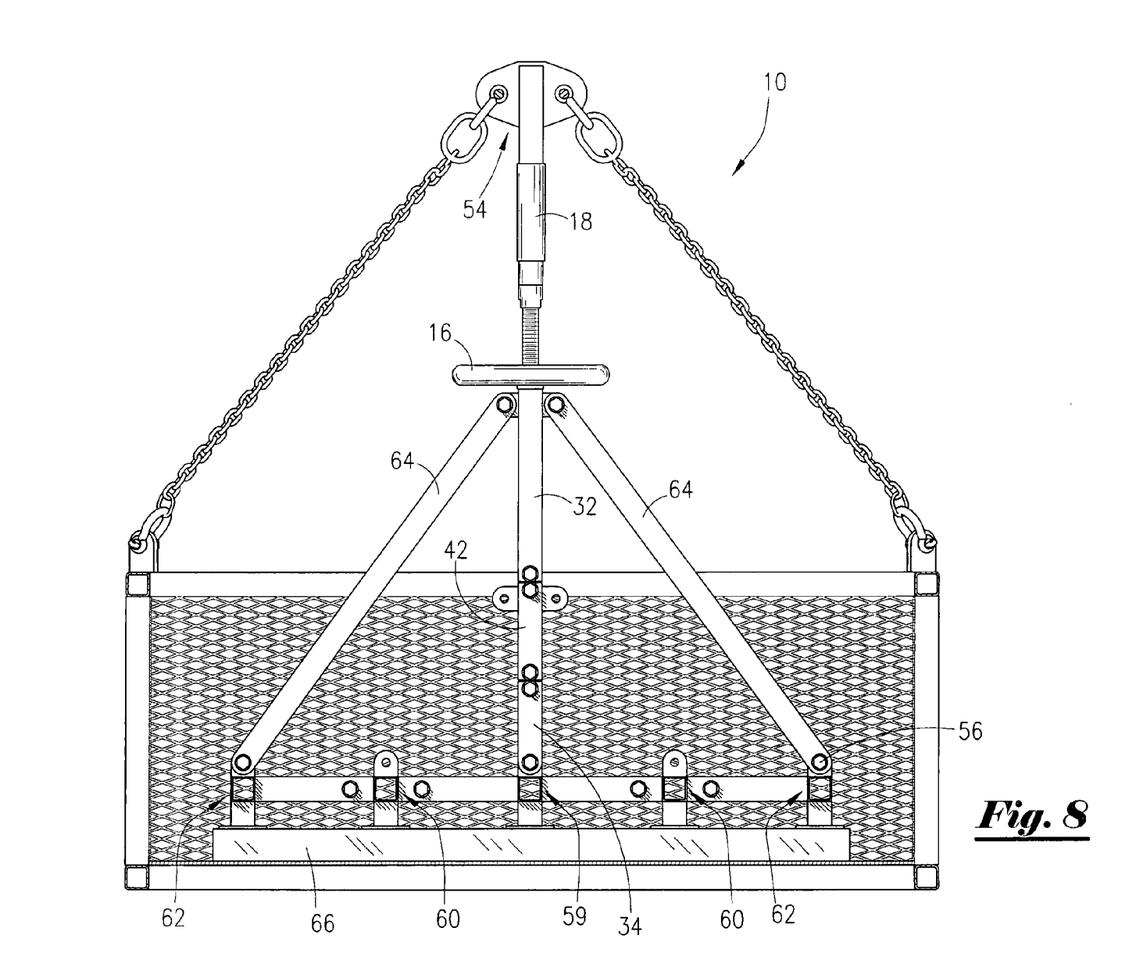
FIG. 8 is a is a partial cross-sectional side elevation view of the embodiment illustrated in FIG. 7.
Figure 11:
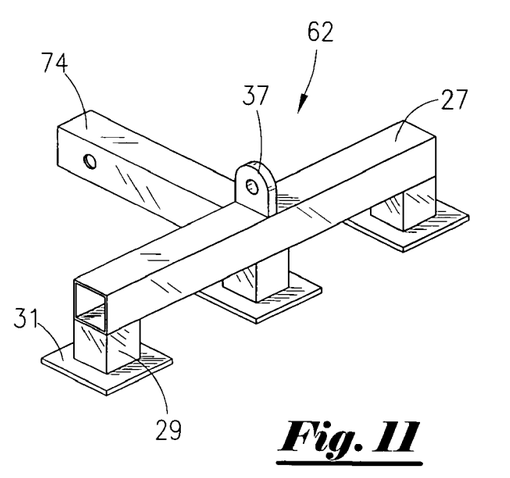
FIG. 11 is a partial isometric view of the end foot assembly.

As seen in FIG. 7 the apparatus 10 may be extended to accommodate a larger container 57 by adding more foot assemblies 59, 60 and 62 adapted for interconnection with each other and braced back to the column 32 with trusses or braces 64. In this case the wooden beams 66 extend longitudinally along the interior floor 68 of the container 57. Since the longer containers require longer slings, the column assembly 32 must also be extended using the optional lengths of column tubing 42 and additional stub members 44 as better seen in FIG. 8. In this case the foot assemblies 59, 60, 62 are arranged with the central foot assembly 59 being connected to end foot assemblies 62 by adaptor foot assemblies 60 located either side of the column members 32, 42, 34. As seen in FIG. 11 end foot assemblies 62 are fitted with a cooperative pad eye 37 for pivotally connecting the leg braces or trusses 64 which are in turn pivotally connected to the column pad eyes 46 best seen in FIG. 5. Again the assemblies are pinned with fasteners 56 at all joints.

Figure 9:
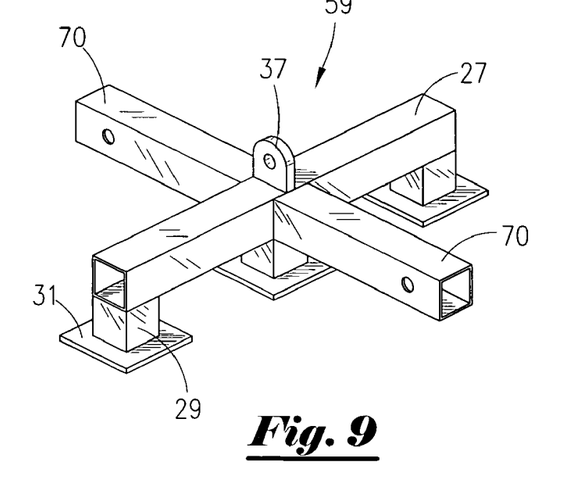
FIG. 9 is a partial isometric view of the central foot assembly.

The footing member 26, as shown in FIG. 5, includes a central horizontal bearing member 27 as shown in FIG. 9 usually constructed of square tubing, and a plurality of vertical legs 29 attached to the underside of the horizontal member 27, each having base plates 31 attached to their exposed ends and a pad eye vertically attached centrally to the upper or back of the horizontal member 27. When footing extension member assemblies are used for extended containers such as that shown in FIG. 8, or even longer containers, the apparatus 10 may be extended by adding multiples of the foot members 59, 60, 62, to the assembly. These footings are variations of the footing assembly 26 as shown in FIG. 5. The central foot assembly 59, as seen in FIG. 9 and as arranged in FIG. 12, further includes horizontal extension tube members 70 extending outwardly from the center of the horizontal member 27. An end footing assembly is formed by adding a single horizontal extension member 74, as shown in FIG. 11, to a footing assembly 26.

Figure 10:
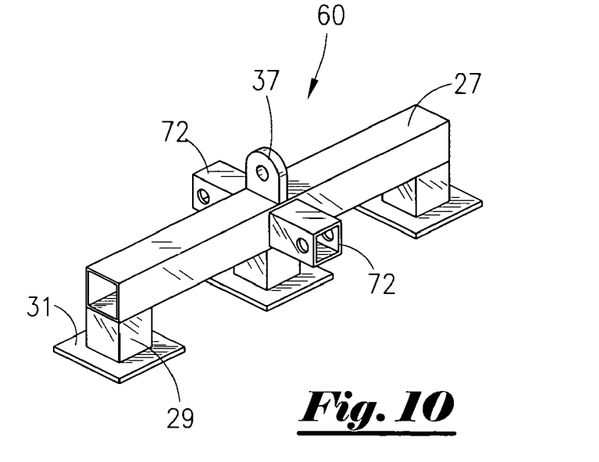
FIG. 10 is a partial isometric view of the adapter foot assembly.
Figure 12:
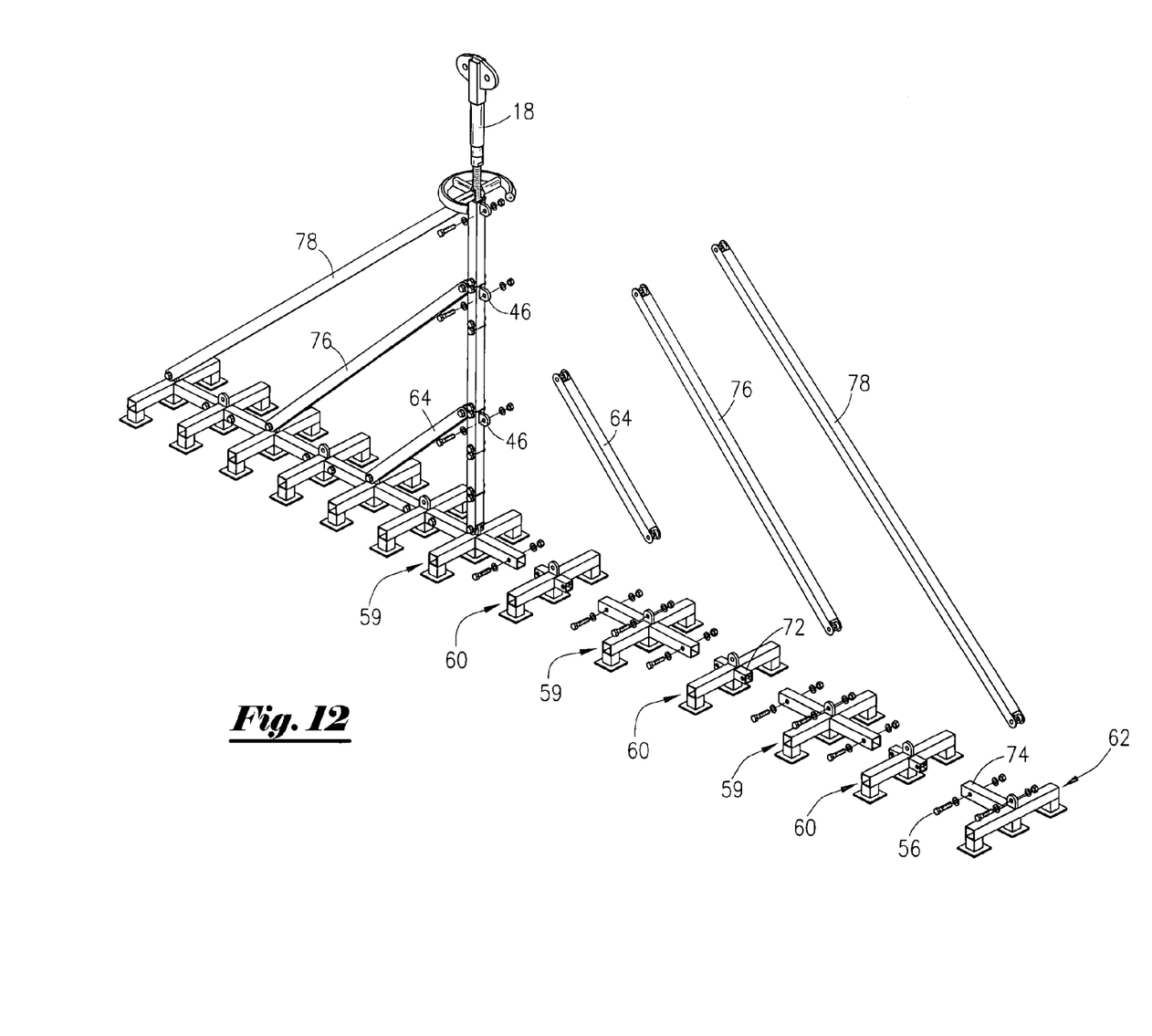
FIG. 12 is an isometric view of the apparatus utilizing multiple footing assemblies.

Another footing member 60 is modified as shown in FIG. 10 by adding horizontal tubular stub members 72 to a footing assembly 26 that are telescopically cooperative with horizontal members 70, 74 located on central and end foot assemblies 59, 62. As the assembly 10 grows relative to the length of the container 57 additional trusses or braces 76,78 are required as shown in FIG. 12, attachable to the footing 59,60, 62, and the column pad eyes 46 located as required to equally distribute the force being applied by the actuator 18 to the floor of the container and all of its framing via the slings 14 simultaneously. Again, fastener assemblies 59 consisting of bolts, nuts and washers or pin arrangement are used to connect the footing assembly, its brace members, and vertical column extension members.

Lifting container manufacturers are required to certify their containers according to established guidelines set out by the American Bureau of Shipping (ABS), the American Petroleum Institute (API), the Det Norske Veritas (DNV), and others. Such lifting containers and their rigging must be labeled identifying the manufacturer of the container, its Maximum Breaking Load (MBL), its Maximum Gross Mass (MGM), its maximum permissible working load or net weight, its Safe Working Load (SWL), the certifying authority, the date of the last certification, as well as other pertinent information. These periodic certifications are generally required every 6 years, following repairs to the structural members or at the discretion of the inspection authority. During such inspection and testing the container must be subjected to 2.5 times the MGM over four lifting points and 1.5 times the MGM over two lifting points. To achieve these stress levels a solid mass is generally placed within the container prior to being lifted. Applicant has found that this process does not provide a true representation of day-to-day stress imposed on the containers and actually provides structural support to the container's vertical and upper structural members during such test. Therefore, the instant test apparatus is advantageous in that loads are applied to the container's flooring and simultaneously to the container's structural members and its rigging in a somewhat uneven manner that more accurately represents the container's normal loading characteristics.

In operation the test assembly 10, as seen in FIG. 2, is placed within the confines of the container using wooden support beams 28 placed on the flooring of the container directly below each of the plates 31 of the footing assemblies 26, or 59,60, 62, as seen in FIG. 7, in a manner whereby the load applied to the footing assemblies will be redistributed over a large area of the container floor. It should be noted that long wooden beams may be shaped having a greater cross section near their center point or be reinforced to reduce defection. In any case, as seen in FIG. 3, the load is applied to the floor 24 of the container 12 without supporting its vertical columns or upper container frame members.

The slings 14, which can be chains, web belts or cables, are then attached to the pad eyes 38 or similar connecting means attachable to the base or blind end of the actuator 18. The hand wheel 16 is then rotated, thereby extending the length of the threaded rod 48, as seen in FIG. 5, relative to the actuator 18 and the vertical column assembly 32 thus applying tension to the slings 14. It should be noted that it is anticipated that other means of tensioning the slings 14 or compensating for warped containers may be used, such as coupling small screw jacks or belt ratchet jacks inline with the slings 14, in which case the vertical column assembly 32, threaded rod 48, and hand wheel 16 serving as a jacking screw for extending the length of the column assembly 32 would be redundant. Once tension is applied to the slings 14, pressure is then applied to the linear actuator 18 via lines 20 connected to a pressure source, thus applying a load to the footing assemblies as seen in FIG. 1.

It is desirable to establish the force being applied by the actuator 18 to the footing member assemblies 26, 59, 60, 62 under controlled test conditions using load sensors at strategic points for each size container to be subjected to structural stress. Thereafter, field tests can be correlated to specific pressure applications. This pretest may be necessary due to variations in construction between manufacturers and their designated safe working loads. Testing the containers in this manner does not require the use of a crane to lift the containers containing the required stress loads.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. A test apparatus for loading certification of offshore lifting containers comprising:
    a) vertical column assembly having an upper and lower end comprised of at least a pressure actuator means for longitudinally extending its length
    b) an attachment assembly having a plurality of flexible members attached to one end of said vertical column assembly and means for connecting to lifting points of a container under test; and
    c) a footing assembly attached to an end of said vertical column assembly opposite said attachment assembly having means for substantially equalizing a force exerted by said pressure actuator across structural members of a container under test.

2. The test apparatus of claim 1 wherein said vertical column assembly further comprises a screw jack assembly for extending said vertical column.

3. The test apparatus of claim 1 wherein said vertical column assembly further comprises telescopic-extension members.

4. The test apparatus of claim 1 wherein said flexible members further comprise means for extending their length.

5. The test apparatus of claim 1 wherein said footing assembly comprises a first transverse elongated member pivotally attached to said vertical column.

6. The test apparatus of claim 1 wherein said footing assembly further comprises at least one brace member connected at one end to said vertical column and one end to said footing assembly.

7. The test apparatus of claim 1 wherein said footing assembly comprises a plurality of said transverse elongated members removably attached in parallel to said first transverse elongated member.

8. The test apparatus of claim 7 wherein each of said transverse elongated members comprise a plurality of vertical feet located perpendicular to said transverse elongated members.

9. The test apparatus of claim 1 wherein said vertical column assembly further comprises an extension member having means for telescopic adjustment.

10. The test apparatus of claim 8 wherein said footing assembly further comprises means for substantially equalizing a load exerted on said plurality of transverse elongated members.

11. A test apparatus for loading certification of offshore lifting containers comprising:
    a) a vertical column assembly comprising a mechanical incremental extending means and a pressure operated extending means;
    b) a footing assembly centrally attached to said vertical column assembly; and
    c) a means for redistributing loading applied to said footing assembly.

12. The test apparatus according to claim 11 wherein said vertical column further comprises extension members.

13. The test apparatus according to claim 11 wherein said pressure operated extending means is a hydraulic operated linear actuator.

14. The test apparatus according to claim 11 wherein said pressure operated extending means is a compressed air operated linear actuator.

15. The test apparatus according to claim 11 wherein said mechanical incremental extending means is a threaded rod attached to the rod end of said pressure operated extending means and a rotatable hand wheel threaded upon said threaded rod.

16. The test apparatus according to claim 15 wherein at least a portion of said threaded rod is located within a tubular portion of said central column.

17. The test apparatus according to claim 11 wherein said means for redistributing a load applied to said central footing assembly is a plurality of wood beams.

18. The test apparatus according to claim 11 wherein said structural test apparatus further comprises a plurality of footing extension assemblies attached to said footing assembly.

19. The test apparatus according to claim 18 wherein said structural test apparatus further comprises a plurality of trusses connected to said footing extension assemblies and said vertical column assembly.

20. The test apparatus according to claim 11 wherein said structural test apparatus further comprises a connecting means attached to a blind end of said pressure operated extending means.

21. A method for testing the structural integrity of a lifting container comprising the steps of:
    a) placing a test apparatus comprising i) a central vertical column assembly having means for incrementally extending its length; ii) a plurality of flexible members attached to said central column; and iii) a footing assembly attached horizontally to said central vertical column within the confines of the container;
    b) b) supporting said test apparatus upon a plurality of load distribution members located between said footing assembly and said container;
    c) c) attaching said flexible members to said container;
    d) d) adjusting said means for incrementally extending the length of said vertical column until said flexible members are taut; and
    e) e) applying column loading to said footing assembly by further incrementally extending the length of said vertical column and thus distributing said loading throughout said container until a predetermined stress load on the container is reached.

22. The method according to claim 21 wherein the step of incrementally extending the length of said vertical column is achieved by activation of a linear actuator being extended to a predetermined pressure setting.

23. The method according to claim 21 further includes the step of extending said footing assembly to approximate said container length and applying bracing between said footing assembly and said vertical column.

24. A test apparatus for loading certification of offshore lifting containers comprising:
    a) a footing b) at least one pressure extendable column pivotally connected to said footing;

c) a rigging attached to said extendable column opposite said footing; and d) a plurality of flexible slings attached to said rigging connectable to lifting points of said lifting containers.

25. The test apparatus according to claim 24 wherein said rigging further comprises spreaders, shackles and pins.

26. A method for load testing and certifying the integrity of containers used for hoisting materials in an off-shore environment comprising the steps of:

a. placing an apparatus comprising a footing, at least one pressure extendable column connected to said footing, a rigging attached to said pressure extendable column opposite said footing, a plurality of flexible slings attached to said rigging, within the confines of a container having lifting points used for hoisting materials in an off-shore environment;

b. attaching said rigging and slings to said lifting points; and     c. extending at least one said pressure extendable column to a predetermined pressure setting thus exerting a strain on said lifting points.

\* \* \* \* \*